United States Patent
Azuma (10) Patent No.: US 12,330,982 B2
(45) Date of Patent: Jun. 17, 2025

(54) METHOD FOR MANUFACTURING GLASS PLATE, METHOD FOR CHAMFERING GLASS PLATE, AND METHOD FOR MANUFACTURING MAGNETIC DISK

(71) Applicant: HOYA CORPORATION, Tokyo (JP)

(72) Inventor: Shuhei Azuma, Hung Yen Province (VN)

(73) Assignee: HOYA CORPORATION, Tokyo (JP)

(*) Notice: Subject to any disclaimer, the term of this patent is extended or adjusted under 35 U.S.C. 154(b) by 731 days.

(21) Appl. No.: 17/297,973

(22) PCT Filed: Dec. 2, 2019

(86) PCT No.: PCT/JP2019/047102
§ 371 (c)(1),
(2) Date: May 27, 2021

(87) PCT Pub. No.: WO2020/111282
PCT Pub. Date: Jun. 4, 2020

(65) Prior Publication Data
US 2022/0089479 A1      Mar. 24, 2022

(30) Foreign Application Priority Data
Nov. 30, 2018   (JP) .................. 2018-225568

(51) Int. Cl.
*C03C 23/00*     (2006.01)
*B23K 26/00*     (2014.01)
(Continued)

(52) U.S. Cl.
CPC ...... *C03C 23/0025* (2013.01); *B23K 26/0006* (2013.01); *B23K 26/0736* (2013.01);
(Continued)

(58) Field of Classification Search
None
See application file for complete search history.

(56) References Cited

U.S. PATENT DOCUMENTS

| 6,521,862 B1 | 2/2003 | Brannon |
| 2002/0108400 A1 | 8/2002 | Watanabe et al. |

(Continued)

FOREIGN PATENT DOCUMENTS

| CN | 101646524 A | 2/2010 |
| CN | 103035255 A | 4/2013 |

(Continued)

OTHER PUBLICATIONS

WO-2017115871-A1 Clarivate Analytics Machine Translation Retrieved Jan. 9, 2024. (Year: 2024).*

(Continued)

*Primary Examiner* — Lisa L Herring
(74) *Attorney, Agent, or Firm* — Global IP Counselors, LLP (57) ABSTRACT

A method for manufacturing a disk-shaped glass plate in which shape processing is performed on an edge surface of the glass plate includes processing the edge surface into a target shape by irradiating the edge surface with a laser beam while moving the laser beam relative to the edge surface in a circumferential direction of the glass plate. A cross-sectional intensity distribution of the laser beam with which the edge surface is irradiated is a single mode, and W1>Th holds true and Pd×Th is in a range of 0.8 to 3.5 [W/mm] when a width of luminous flux of the laser beam in a thickness direction of the glass plate at an irradiation position of the edge surface is W1 [mm], a thickness of the glass plate is Th [mm], and a power density of the laser beam is Pd.

20 Claims, 4 Drawing Sheets

(51) Int. Cl.
*B23K 26/073* (2006.01)
*B23K 26/08* (2014.01)
*B23K 26/352* (2014.01)
*B23K 26/354* (2014.01)

(52) U.S. Cl.
CPC ........ *B23K 26/354* (2015.10); *B23K 26/3576* (2018.08); *B23K 26/08* (2013.01)

(56) References Cited

U.S. PATENT DOCUMENTS

| | | |
|---|---|---|
| 2008/0202167 A1 | 8/2008 | Cavallaro et al. |
| 2012/0247155 A1* | 10/2012 | Murakami ............... C03C 3/085 65/61 |
| 2013/0089754 A1 | 4/2013 | Nishimori |
| 2015/0053657 A1 | 2/2015 | Chadin et al. |
| 2015/0165548 A1 | 6/2015 | Marjanovic et al. |
| 2015/0269960 A1 | 9/2015 | Nishimori |
| 2015/0269961 A1 | 9/2015 | Nishimori |
| 2018/0186677 A1 | 7/2018 | Ito et al. |
| 2021/0053862 A1 | 2/2021 | Ito et al. |
| 2022/0089479 A1 | 3/2022 | Azuma |
| 2022/0227654 A1 | 7/2022 | Azuma |

FOREIGN PATENT DOCUMENTS

| | | | |
|---|---|---|---|
| CN | 104551412 A | 4/2015 | |
| CN | 107922259 A | 4/2018 | |
| CN | 113924276 A | 1/2022 | |
| JP | 2002150546 A | 5/2002 | |
| JP | 2010519164 A | 6/2010 | |
| JP | 2016534012 A | 11/2016 | |
| JP | 2017511777 A | 4/2017 | |
| JP | 2017197414 A | 11/2017 | |
| JP | 2018123013 A | 8/2018 | |
| WO | 2007094160 A1 | 8/2007 | |
| WO | 2014192482 A1 | 12/2014 | |
| WO | WO-2017115871 A1 * | 7/2017 | ............... B28D 1/24 |
| WO | 2020111282 A1 | 6/2020 | |

OTHER PUBLICATIONS

International Search Report in PCT/JP2019/047102 dated Feb. 25, 2020.

* cited by examiner

METHOD FOR MANUFACTURING GLASS PLATE, METHOD FOR CHAMFERING GLASS PLATE, AND METHOD FOR MANUFACTURING MAGNETIC DISK

CROSS-REFERENCE TO RELATED APPLICATIONS

This is a U.S. National stage application of International Patent Application No. PCT/JP2019/047102, filed on Dec. 2, 2019, which, in turn, claims priority to Japanese Patent Application No. 2018-225568, filed in Japan on Nov. 30, 2018. The entire contents of Japanese Patent Application No. 2018-225568 are hereby incorporated herein by reference.

BACKGROUND

Field of the Invention

The present invention relates to a method for manufacturing a glass plate in which shape processing is performed on an edge surface of a glass plate having a disk shape, a method for chamfering a glass plate in which a chamfered surface is formed on an edge surface of a disk-shaped glass plate through irradiation with a laser beam, and a method for manufacturing a magnetic disk using the method for manufacturing a glass plate or the method for chamfering a glass plate.

Background Information

A magnetic disk obtained by providing a magnetic layer on a nonmagnetic glass substrate for a disk-shaped magnetic disk is used in a hard disk drive for recording data.

When a magnetic-disk glass substrate is manufactured, particles are likely to originate from an edge surface of a disk-shaped glass blank that is the base of the magnetic-disk glass substrate that is to be a final product, and therefore it is preferable that the surfaces of edge surfaces of the disk-shaped glass blank are smoothened in order to inhibit fine particles from adhering to main surfaces of the disk-shaped glass blank, and from adversely affecting the performance of the magnetic disk. Also, it is preferable that edge surfaces of the glass plate have target shapes to realize precise incorporation of a magnetic disk into an HDD device, and make an outer circumferential edge surface of the glass substrate suitable to be held by a jig for holding the outer circumferential edge surface when a magnetic film is formed on the main surfaces of the glass substrate.

A method exists for chamfering an edge of a glass plate using a laser beam, which is known as a method for making an edge surface of a glass plate into a target shape (JP 2017-511777A). Specifically, an ultrashort pulse laser is used to cut an edge into a desired chamfered shape, and the edge is irradiated with a $CO_2$ laser beam subsequent to the processing using the ultrashort pulse laser.

SUMMARY

With the above-described method, in the edge surface shaping processing for forming a side wall surface and a chamfered surface on the edge surface of the glass plate, a member, which is to be removed, is separated through irradiation with a $CO_2$ laser beam after the edge has been cut by the ultrashort pulse laser. However, there are cases where an edge surface of a glass plate is not able to be processed into a target shape due to accuracy in edge cutting using an ultrashort pulse laser, and the edge surface is unlikely to have a target shape suitable for being held by a jig when forming the above-described magnetic film, resulting in variations in the shape of the edge surfaces. Also, the shape processing operation is complicated because edge surface shape processing is performed using both an ultrashort laser and a $CO_2$ laser.

In recent years, in order to increase the capacity of a hard disk drive device (referred to as an "HDD" device hereinafter), there has been a trend of reducing the thickness of a glass plate for a magnetic disk and increasing the number of magnetic disks incorporated in an HDD device. In this case, a glass material for increasing the rigidity of a glass plate is used in order to suppress vibration of the glass plate that is likely to occur due to the thickness of a glass substrate being reduced. A glass material with high rigidity generally has a high softening point, and thus it is difficult to perform shape processing thereon with a laser beam. Therefore, in order to process an edge surface of a glass plate that is thin and has a high softening point into a target shape using a laser beam, and to inhibit the shape of the edge surface varying from the target shape, irradiation conditions of the laser beam need to be set more precisely than conventional conditions.

In view of this, the present invention aims to provide a method for manufacturing a glass plate and a method for manufacturing a magnetic disk by which, when shape processing is performed using a laser beam on an edge surface of a glass plate having a disk shape, the edge surface can be shaped through a simple operation without the shape of the edge surface varying from a target shape.

One aspect of the present invention is a method for manufacturing a glass plate in which shape processing is performed on an edge surface of a glass plate having a disk shape. The disk-shaped glass plate has a main surface and an edge surface that is perpendicular to the main surface.

This manufacturing method includes:
a step of processing the edge surface into a target shape by irradiating the edge surface with a laser beam while moving the laser beam relative to the edge surface in a circumferential direction of the glass plate having the disk shape,
in which a cross-sectional intensity distribution of the laser beam with which the edge surface is irradiated is a single mode, and $W1>Th$ holds true and $Pd \times Th$ is in a range of 0.8 to 3.5 [W/mm] when a width of luminous flux of the laser beam in a thickness direction of the glass plate at an irradiation position of the edge surface is W1 [mm], a thickness of the glass plate is Th [mm], and a power density of the laser beam is Pd.

Another aspect of the present invention is a method for manufacturing a glass plate in which shape processing is performed on an edge surface of a glass plate having a disk shape. The disk-shaped glass plate has a main surface and an edge surface that is perpendicular to the main surface.

This manufacturing method includes:
a step of processing the edge surface into a target shape by irradiating the edge surface with a laser beam to form a chamfered surface on the edge surface while moving the laser beam relative to the edge surface in a circumferential direction of the glass plate having the disk shape,
in which a cross-sectional intensity distribution of the laser beam with which the edge surface is irradiated is a single mode, and a value of $Pd \times Th$ and a value of a moving speed are adjusted such that $W1>Th$ holds true when a width of luminous flux of the laser beam in a thickness direction of the glass plate at an irradiation position of the edge surface is W1 [mm], a thickness of the glass plate is Th [mm], and a power density of the laser beam is Pd, and, y is in a range of 11.2×x−4.7 or lower when the Pd×Th is x and the moving speed at which the laser beam moves along the edge surface is y.

It is preferable that the edge surface of the glass plate is irradiated with the laser beam from a normal direction of the edge surface.

It is preferable that, in the shape processing, irradiation conditions of the laser beam are set so as to form, on the edge surface, a side wall surface that is orthogonal to two opposing main surfaces of the glass plate, and chamfered surfaces connecting ends on both sides of the side wall surface and ends of the main surfaces to each other.

It is preferable that the irradiation conditions are set such that a ratio (C/Th) of a length C of the chamfered surface extending along the main surfaces relative to the thickness Th is in a range of 0.1 to 0.7.

It is preferable that a surface roughness Rz of the edge surface formed by the laser beam is 0.3 μm or less, and an arithmetic average roughness Ra thereof is 0.03 μm or less.

It is preferable that the luminous flux of the laser beam with which the edge surface is irradiated has an elliptical shape, and a ratio (W2/D) of a length W2 of the luminous flux of the laser beam, in the circumferential direction, with which the edge surface is irradiated, relative to a diameter D of the glass plate is in a range of 0.03 to 0.3.

It is preferable that the power density Pd is set such that a diameter of the glass plate formed through irradiation with the laser beam is larger than a diameter of the glass plate before being irradiated with the laser beam.

It is preferable that a moving speed at which the laser beam moves along the edge surface is in a range of 0.7 to 100 [mm/s].

It is preferable that the glass plate has a Young's modulus of 70 [GPa] or more.

It is preferable that the glass plate has a coefficient of linear thermal expansion of $100 \times 10^{-7}$ [1/K] or less.

It is preferable that the thickness Th is 0.7 mm or less.

It is preferable that the method for manufacturing a glass plate includes a step of grinding or polishing the main surface of the glass plate subjected to the shape processing, in which no edge surface is polished after the shape processing and before the main surface is ground or polished, or even if the edge surface is polished, an amount of machining allowance for polishing an edge surface is 5 μm or less.

Another aspect of the present invention is a method for chamfering a glass plate in which a chamfered surface is formed on an edge surface of a glass plate having a disk shape through irradiation with a laser beam. The edge surface of the glass plate before the chamfered surface is formed has at least a surface that is perpendicular to a main surface in a central portion of the glass plate in a thickness direction of the glass plate. In this chamfering method, an edge portion of the edge surface of the glass plate is chamfered into a round shape by softening and/or melting the edge portion by irradiating the edge surface of the glass plate with a laser beam, and Pd×Th and a moving speed V are controlled when a thickness of the glass plate is Th [mm], a power density of the laser beam is Pd, and the moving speed at which the laser beam moves along the edge surface is V, such that a surface that is perpendicular to the main surface of the glass plate is also formed on the edge surface after the chamfered surface is formed.

It is preferable that, when the Pd×Th is x, and the moving speed V is y, a value of the Pd×Th and a value of the moving speed V are adjusted such that y is in a range of 11.2×x−4.7 or lower and 5.4×x−4.5 or higher.

Yet another aspect of the present invention is a method for manufacturing a glass plate in which the edge surface of the glass plate having the disk shape is chamfered using the chamfering method.

Still another aspect of the present invention is a method for manufacturing a magnetic disk, in which a magnetic film is formed on the main surface of the glass plate manufactured using the method for manufacturing a glass plate.

Another aspect of the present invention is a method for manufacturing a magnetic disk, in which a magnetic film is formed on the main surface of the glass plate manufactured using the method for manufacturing a glass plate.

According to the above-described method for manufacturing a magnetic disk, when shape processing is performed using a laser beam on an edge surface of a glass plate having a disk shape, the edge surface can be shaped through a simple operation without the shape of the edge surface varying from a target shape.

DETAILED DESCRIPTION OF THE EMBODIMENTS

Figure 1:
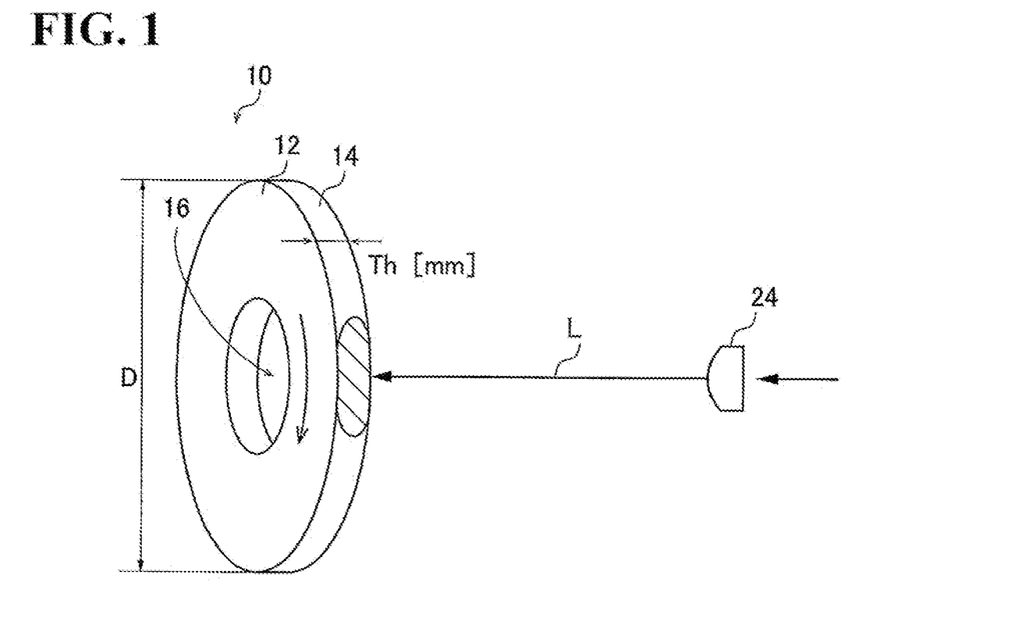
FIG. 1 is a diagram illustrating laser irradiation performed in a method for manufacturing a glass plate according to an embodiment.
Figure 2:
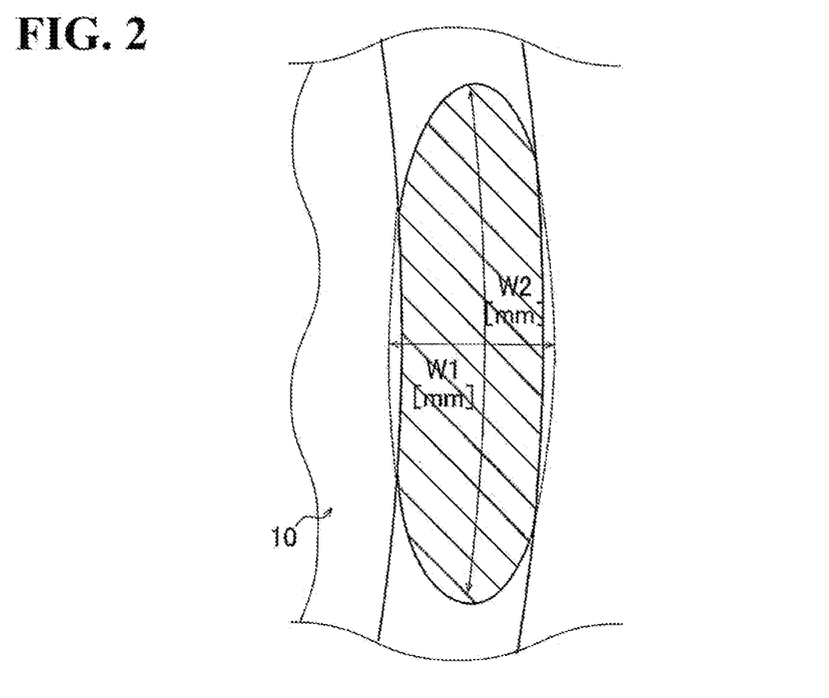
FIG. 2 is a diagram illustrating one example of the shape of luminous flux at a laser irradiation position.
Figure 3:
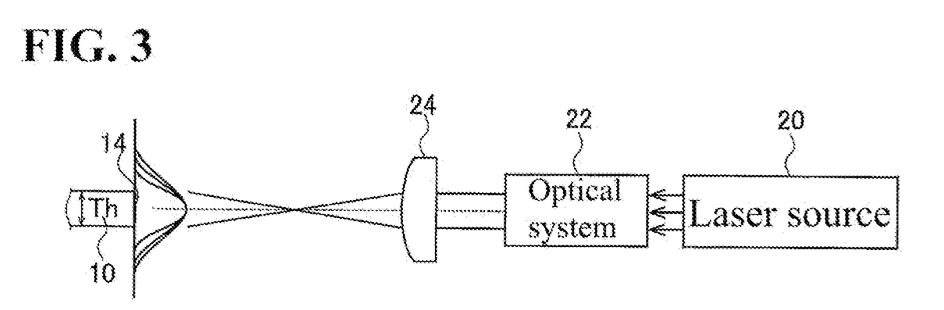
FIG. 3 is a diagram illustrating luminous flux at a laser irradiation position and light intensity distribution.
Figure 4:
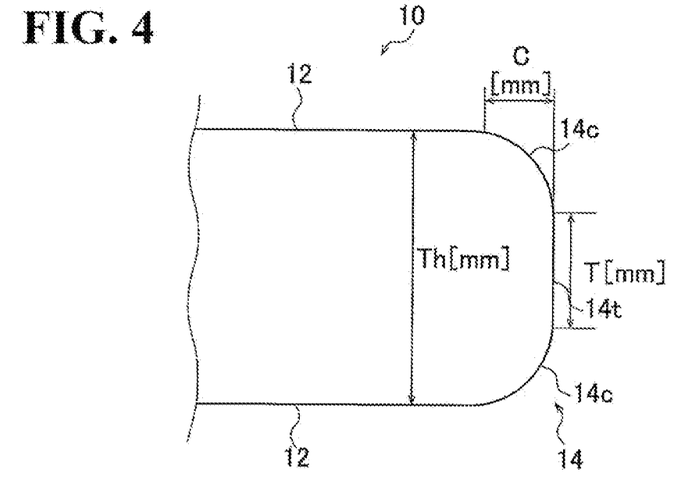
FIG. 4 is a diagram illustrating the shape of an edge surface after being subjected to shape processing using a laser beam.

FIG. 1 is a diagram illustrating laser irradiation performed in a method for manufacturing a glass plate according to an embodiment. FIG. 2 is a diagram illustrating one example of the shape of luminous flux (a spot) at a laser irradiation position. FIG. 3 is a diagram illustrating luminous flux at the laser irradiation position and the light intensity distribution. FIG. 4 is a diagram illustrating the shape of an edge surface after being subjected to shape processing using a laser beam.

A glass plate, which is to be subjected to shape processing using a method for manufacturing a glass plate according to this embodiment, has a disk shape in which a circular hole is provided to form an inner circumferential end concentric with an outer circumferential end, at a central position of the disk shape.

In order to produce a glass plate whose edge surface has a target shape from this glass plate, or to prevent portions connecting the edge surface and main surfaces of the glass plate to each other from being angular edge portions, shape processing for chamfering the portion connecting the main surfaces and the edge surface of the glass plate to each other is performed on the glass plate.

In particular, when a disk-shaped magnetic-disk glass substrate provided with a circular hole is manufactured, it is desired that edge surfaces of the disk-shaped glass plate, which is the base of a magnetic-disk glass substrate that is to be a final product, have target shapes to realize precise incorporation into a magnetic disk into an HDD device, and allow an edge surface of the glass substrate to be reliably held by a jig when a magnetic film is formed on the main surfaces of the glass substrate. Furthermore, it is desired that the surfaces of edge surfaces on which particles are likely to form are smoothened in order to inhibit fine particles from adhering to the main surfaces, and from adversely affecting the performance of the magnetic disk. Thus, in this embodiment, a laser beam is used to perform shape processing for chamfering.

Specifically, as shown in FIG. 1, a disk-shaped glass plate 10 provided with a circular hole 16 has main surfaces 12 and an edge surface 14. The edge surface 14 is an edge surface that is perpendicular to the main surfaces 12. Although an outer circumferential edge surface is denoted as the edge surface 14 to be subjected to shape processing using a laser beam in the example shown in FIG. 1, an inner circumferential edge surface extending along the circular hole 16 can also be subjected to shape processing using the laser beam.

In this embodiment, the edge surface 14 is irradiated with the laser beam, and the edge surface 14 is processed into a target shape as the laser beam L is moved relative to the edge surface 14 in the circumferential direction of the disk-shaped glass plate 10. The laser beam L emitted from a laser source 20, which will be described later, is converted into parallel light through an optical system 22 that includes a collimator and the like, the laser beam L is focused through a focusing lens 24, and the edge surface 14 is irradiated with the expanding laser beam L.

On the other hand, the glass plate 10 is rotated at a constant speed with the central position of the glass plate 10 set as the center of rotation. In this manner, the entire circumference of the edge surface 14 of the glass plate 10 is irradiated with the laser beam L while the laser beam L and the edge surface 14 are moved relative to each other in the circumferential direction of the disk-shaped glass plate 10.

Here, it is preferable that the edge surface 14 is irradiated with the laser beam L from a normal direction of the edge surface 14 to be irradiated. The edge surface 14 is irradiated with the laser beam L from not only a perfectly normal direction (at an inclination angle of 0 degrees) but also a normal direction in the range where the inclination angle to the normal direction is within 10 degrees, which is an allowable range.

The cross-sectional intensity distribution of the laser beam L with which the edge surface 14 is irradiated is a single mode. That is to say, the cross-sectional intensity distribution of the laser beam L is a Gaussian distribution. Irradiation conditions are used in which W1>Th holds true and Pd×Th is in a range of 0.8 to 3.5 [W/mm] in irradiation with the laser beam L when, as shown in FIG. 2, the width of the luminous flux of the laser beam L in the thickness direction of the glass plate 10 at an irradiation position of the edge surface 14 is W1 [mm], the thickness of the glass plate 10 is Th [mm], and the power density of the laser beam L is Pd [W/mm²]. Here, as shown in FIG. 2, the luminous flux of the laser beam L is emitted so as to protrude on both sides in the thickness direction of the glass plate 10. Also, chamfering can be evenly performed on both sides in the thickness direction of the glass plate 10 by making the widths of the protrusions on both sides of the edge surface equal to each other, and the shapes of two chamfered surfaces 14c can be made the same as each other. The power density Pd is a value obtained by dividing the total power P [W] of the laser beam L by the area of the luminous flux in a portion irradiated with the laser beam L. If the luminous flux of the laser beam L forms an elliptical shape (see FIG. 2) having a short axis radius of W1/2 and a long axis radius of W2/2, the power density Pd is defined as 4×P/W1/W2/π [W/mm²] (π indicates pi).

Here, although a $CO_2$ laser beam is used as one example of the laser beam L, the laser beam L is not limited to the $CO_2$ laser beam as long as it has an oscillation wavelength that is absorbed by glass. Examples of the laser beam L include CO lasers (having an oscillation wavelength of about 5 μm and 10.6 μm) and Er-YAG lasers (having an oscillation wavelength of about 2.94 μm). If a $CO_2$ laser beam is used, it is preferable that the wavelength thereof is set to 3 μm or more. Also, it is more preferable that the wavelength thereof is set to 11 μm or less. If the wavelength of a laser beam is shorter than 3 μm, there are cases where glass is unlikely to absorb the laser beam, and the edge surface 14 of the glass plate 10 cannot be sufficiently heated. Also, if the wavelength thereof is longer than 11 μm, it may be difficult to obtain a laser device. Note that the oscillation form of a laser source 20 is not particularly limited, and any one of continuous oscillation light (CW light), pulse oscillation light, and light obtained by modulating continuous oscillation light may be used. However, in the case of pulse oscillation light and modulated light of continuous oscillation light, there is a concern that, if the relative moving speed of the laser beam L is high, the shape of the chamfered surfaces 14c may be uneven in the moving direction. In such a case, oscillation and modulation frequencies are preferably 1 kHz or more, more preferably 5 kHz or more, and even more preferably 10 kHz or more.

The width W1 and the length W2, which will be described later, of the luminous flux can be set by adjusting the position where the glass plate 10 is irradiated with the laser beam L, using two cylindrical lenses, for example. Also, the width W1 can be obtained from a beam profiler, and the length W2 can be obtained from the shape of a beam obtained by the beam profiler and a diameter D of a glass plate.

It is possible to sufficiently irradiate a side end of the edge surface 14 on the main surface 12 side with the laser beam L by making the width W1 of the laser beam L larger than the thickness Th of the glass plate 10, and to form a chamfered surface by softening and/or melting a portion of the glass plate 10 using heat.

If a ratio Th/W1 of the width W1 of the laser beam L relative to the thickness of the glass plate 10 is excessively increased (i.e., Th/W1 is excessively close to 1), the edge portion of the glass plate 10 is poorly heated and the central portion of the edge surface of the glass plate in the thickness direction is strongly heated due to the influence of the laser beam in a range with a steep slope in laser intensity distribution. Therefore, it is not preferable to excessively increase the ratio Th/W1 because the edge surface is likely to have a spherical shape, which will be described later. Also, if the ratio Th/W1 of the width W1 of the laser beam L relative to the thickness of the glass plate 10 is excessively reduced, there are cases where it is difficult to form a chamfered surface because the edge surface 14 is heated by the laser beam IL excessively poorly. From the above-described viewpoint, it is preferable that Th/W1 is in a range of 0.3 to 0.9.

Incidentally, if the power density Pd of the laser beam L is excessively low, the edge surface 14 is not sufficiently heated, and a chamfered surface cannot be formed. On the other hand, if the power density Pd is excessively high, the entire edge surface 14 is rounded into a spherical shape due to heat, and the thickness of the spherical shape in the thickness direction is larger than the thickness Th of the glass plate 10.

Therefore, the irradiation conditions are set such that W1>Th holds true and Pd×Th is in a range of 0.8 to 3.5 [W/mm]. Pd×Th is preferably 3.0 [W/mm] or less, more preferably in a range of 1.0 to 2.8 [W/mm], and even more preferably in a range of 1.2 to 2.3 [W/mm].

Because Pd×Th is set to a range of 0.8 to 3.5 [W/mm], if the thickness Th of the glass plate 10 is reduced and the irradiation conditions are out of a range of 0.8 to 3.5 [W/mm], the power density Pd is increased. By increasing the power density Pd, a portion by which the area of the glass plate 10 irradiated with the laser beam L is reduced can be compensated for by the power density Pd, and a chamfered surface can be formed.

As a result of using such irradiation conditions, the edge surface 14 of the glass plate 10 can have a target shape without varying from the target shape, and a chamfered surface can be formed. Also, the surface of the edge surface 14 can be smoothened.

Although the chamfered surfaces 14c can be formed in the above-described embodiment with the range of the value of Pd×Th being limited, the chamfered surfaces 14c can be efficiently formed on the edge surface 14 of the glass plate 10 by irradiating the edge surface 14 with the laser beam L with the value of Pd×Th and the value of the moving speed being controlled. Also, it is possible to form not only the chamfered surfaces 14c but also a surface that is perpendicular to the main surfaces 12 of the glass plate 10, i.e., a side wall surface 14t, by controlling the value of Pd×Th and the value of the moving speed more specifically. Accordingly, the shape of the edge surface 14 can be a target shape without varying from the target shape. Also, the surface of the edge surface 14 can be smoothened. In this case, the edge surface 14 of the glass plate 10 before the chamfered surfaces 14c are formed has a surface that is perpendicular to the main surfaces 12 at least at the central portion in the thickness direction of the glass plate 10. It is possible to chamfer edge portions (the border portions between the main surfaces 12 and the edge surface 14) on both sides of the edge surface 14 of the glass plate 10 in the thickness direction into a round shape, by softening and/or melting the edge portions of the edge surface 14, for example, corner portions that are bent at a right angle, by irradiating the edge surface 14 of the glass plate 10 with the laser beam L, and to form a surface (the side wall surface 14t) that is sandwiched between the chamfered surfaces 14c on the two sides in the thickness direction of the glass plate 10 and is perpendicular to the main surfaces 12 on the chamfered edge surface 14. In particular, the edge surface 14 preferably includes a surface that is perpendicular to the main surfaces 12 and whose length is 1/10 or more of the thickness Th, and the chamfered surface 14c. It is more preferable that a length T (see FIG. 4) of the above-described perpendicular surface (the side wall surface 14t) is 1/5 or more of the thickness Th.

According to an embodiment, the perpendicular surface formed through irradiation with the laser beam L together with the chamfered surfaces 14c is different from the surface of the edge surface 14 that is perpendicular to the main surfaces 12 before the chamfered surfaces 14c are formed through irradiation with the laser beam L, and is a newly formed surface, and the surface roughness Rz and the arithmetic average roughness Ra thereof are reduced due to irradiation with the laser beam L. Also, the distance in the radial direction from the central position of the disk-shaped glass plate 10 to the perpendicular surface is increased.

Note that the surface that is perpendicular to the main surfaces 12 refers to a surface in a range of 90 degrees±2 degrees relative to the main surfaces 12 as an allowable range.

It is preferable to form a surface (the side wall surface 14t) that is perpendicular to the main surfaces 12 in addition to the edge surface 14 and the chamfered surfaces 14c in this manner because it is possible to suppress variations in the outer diameter (diameter) or the inner diameter (the diameter of the circular hole 16) of the glass plate 10 provided with the chamfered surfaces 14c in one glass plate 10 or between the glass plates 10. If the outer diameter varies, for example, there is risk that, when a plurality of the glass plates 10 are incorporated into an HDD device as a magnetic-disk substrate and are rotated, the flow of air is likely to be disrupted, resulting in problems such as a head crash. Also, there is a risk that, when a magnetic film is formed using a film forming device such as a sputtering device, problems may be induced such as failing to hold the edge surface 14 of the glass plate 10 and the glass plate 10 falling. Also, if the inner diameter of the glass plate 10 varies, there are cases where a spindle cannot be passed through the glass plate 10 when the glass plate 10 is incorporated into an HDD device, and there is a risk that the gap between the glass plate 10 and the spindle may excessively increase, and rotation may become unstable.

The reason why the shape of the chamfered surfaces 14c can be changed into various shapes by controlling the above-described values of Pd×Th and the moving speed is based on the following ideas.

That is, it was found that, if a central portion at least in the thickness direction of the edge surface 14 of the glass plate 10 before being irradiated with the laser beam L is the surface (the side wall surface 141) that is perpendicular to the main surfaces 12, it is possible to form a surface (the side wall surface 14t) that is perpendicular to the main surfaces 12 while forming the chamfered surfaces 14c by adjusting conditions under which the edge surface is irradiated with the laser beam L. Although this mechanism is not always clear, it is assumed that there is a condition under which the vertical surface of the edge surface 14 is formed between the condition under which chamfering of the edge surface 14 does not proceed (see FIG. 5A) and the condition under which the entire edge surface 14 is rounded (see FIG. 5B), and this condition can be selected by adjusting Pd×Th and the moving speed as appropriate. That is, if the value of the moving speed is kept constant and the value of Pd×Th is increased, for example, formation of the chamfered surfaces 14c starts from an edge portion and gradually progresses to the center in the thickness direction, and ultimately the entire edge surface 14 is rounded, thus making the edge surface 14 rounded in the stated order. Here, the length T of the vertical surface (the side wall surface 14t) of the edge surface 14 in the thickness direction gradually decreases as the edge surface 14 is rounded.

A method for manufacturing a glass plate including such shape processing performed on the glass plate 10 will be described using the following method for manufacturing a magnetic-disk glass substrate.

Similarly to the glass plate 10 shown in FIG. 1, a magnetic-disk glass substrate is also a disk-shaped thin glass substrate provided with a circular hole. Although there is no limitation on the size of a magnetic-disk glass substrate, a magnetic-disk glass substrate has a nominal diameter of 2.5 inches or 3.5 inches, for example. In the case of a magnetic-disk glass substrate with a nominal diameter of 3.5 inches, the outer diameter (nominal value) thereof is in a range of 95 mm to 97 mm, for example. In the case of a magnetic-disk glass substrate with a nominal diameter of 2.5 inches, the outer diameter (nominal value) thereof is in a range of 65 mm to 67 mm, for example. The magnetic-disk glass substrate has a thickness of 0.20 mm to 0.65 mm, for example, and preferably has a thickness of 0.30 mm to 0.53 mm. A magnetic disk can be produced by forming a magnetic film on a main surface of this glass substrate.

Similarly to the outer circumferential edge portion of the glass plate 10 shown in FIG. 4, the glass substrate includes a pair of main surfaces 12 and 12, a side wall surface 14$t$ formed on the edge surface 14 of the outer circumferential edge portion, and the chamfered surfaces 14$c$ and 14$c$ are respectively interposed between the side wall surface 14$t$ and the main surfaces 12 and 12, and, similarly to the edge surface 14 of the outer circumferential edge portion, an edge surface of the inner circumferential edge portion thereof includes a side wall surface (not shown) and chamfered surfaces (not shown) respectively interposed between this side wall surface and the main surfaces 12 and 12.

The side wall surface 14$t$ is a surface that extends in a direction that is substantially orthogonal to the main surfaces 12. "Substantially orthogonal" refers to an inclination angle of the side wall surface 14$t$ relative to a main surface 12 being in a range of 88 degrees to 92 degrees. The length of the side wall surface 14$t$ along the thickness direction shown in II. 4 is denoted by T [mm]. The chamfered surfaces 14$c$ are smoothly connected to the main surfaces 12, extending toward the side wall surface 14$t$. The chamfered surfaces 14$c$ form a curved shape that protrudes outward, and are smoothly connected to the side wall surface 14$t$. Therefore, a length C [mm] of a chamfered surface 14$c$ shown in FIG. 4 along the corresponding main surface 12 refers to the length of a portion inclined at an inclination angle of more than 2 degrees and less than 88 degrees relative to the main surface 12. Note that, with regard to a case where the shape of the edge surface 14 is spherical such as that shown in FIG. 5C, which will be described later, the distance in the main surface 12 direction from the thickest position in the thickness direction of the glass plate 10 to the end terminal is denoted by the length C of the chamfered surface 14$c$.

A glass substrate can be prepared by cutting a glass blank whose size is slightly larger than that of the glass plate 10 out from a large glass plate that has been prepared in advance, using a laser beam, for example.

Large sheet glass prior to a glass blank being cut out therefrom is a glass plate with a constant thickness produced using a floating method or a downdraw method, for example. Alternatively, sheet glass may be a glass plate obtained by press-molding a lump of glass using a mold. The thickness of the glass plate is larger than a target thickness of a magnetic-disk glass substrate, which is to the final product, by an amount of machining allowance from grinding and polishing, and the thickness of the glass plate is larger by an amount of about several micrometers to several hundreds of micrometers, for example.

Note that, in addition to a method for cutting out a glass blank using a laser beam, a method may be used in which a notch line is formed on a glass plate using a scriber, and the glass plate is cut by making cracks along the notch line through heating or the like as in a conventional manner.

Also, a glass blank may be cut out through wet etching using an etching liquid such as hydrofluoric acid.

If processing for cutting a glass blank out from large sheet glass is performed using a laser beam, a solid-state laser such as a YAG laser or Nd: YAG laser is used as a laser beam, for example. Therefore, the wavelength of the laser beam is in a range of 1030 nm to 1070 nm, for example. In this case, the laser beam is a pulse laser, for example, and the pulse width is set to $10 \times 10^{-12}$ seconds or less (10 picoseconds or less), for example. Light energy of the laser beam can be adjusted as appropriate according to the pulse width and the repetition frequency of the pulse width. Holes can be intermittently formed through irradiation with this laser beam at discrete positions along a boundary line to be cut.

Then, an outer portion and an inner portion of the glass plate provided with the holes where the above-described boundary line is the boundary are separated from each other by increasing the temperature of the outer portion to be higher than that of the inner portion, or heating the outer portion.

Alternatively, the glass plate may be irradiated with another type of laser beam along the boundary line such that holes, which are formed discretely along the boundary line to be cut, through irradiation with the laser, are linearly continuous. It is possible to use a $CO_2$ laser as the other type of laser beam, for example. It is possible to form linear holes using this laser beam so as to connect intermittently formed holes. In this case, as needed, the outer portion and the inner portion of the glass plate where the above-described boundary line is the boundary are separated from each other by increasing the temperature of the outer portion to be higher than that of the inner portion, or heating the outer portion. It is possible to cut out a circular plate-shaped glass blank from sheet glass in this manner. The surface roughness Rz of an edge surface of the circular plate-shaped glass blank formed in this manner is in a range of 1 to 10 μm, for example, and the arithmetic average roughness Ra thereof is in a range of 0.1 to 1 μm, for example.

Furthermore, in order to form a concentric circular hole in the cutout disk-shaped glass blank using a scriber, similarly to the above-described method, the circular hole is formed through irradiation with a laser beam, or through etching. The glass blank provided with the circular hole serves as a glass blank for producing a magnetic-disk glass substrate.

Shape processing is performed using the laser beam L in order to form the chamfered surface 14$c$ on the edge surface 14 (an edge surface of the outer circumferential edge portion and an edge surface of the inner circumferential edge portion) of the disk-shaped glass plate 10 obtained in this manner and such as that shown in FIG. 1. As described above, in the shape processing using the laser beam L, the shape of the edge surface 14 is processed into a target shape by irradiating the edge surface 14 of the glass plate 10 (glass blank) with the laser beam L preferably from the normal direction of the edge surface 14 while moving the edge surface 14 and the laser beam L relative to each other in the circumferential direction of the disk-shaped glass plate 10. The laser beam L is a laser beam having a cross-sectional intensity distribution of a single mode, and irradiation conditions of the laser beam L are set such that the width W1>thickness Th holds true and Pd×Th is in a range of 0.8 to 3.5 [W/mm]. Accordingly, the shape of the edge surface 14 of the glass plate 10 can have a target shape without varying from the target shape, and the chamfered surfaces 14$c$ can be formed.

Also, the edge surface 14 is irradiated with a laser beam with the value of Pd×Th and the value of the moving speed being controlled, in order to chamfer edge portions of the edge surface 14 of the pre-chamfering glass plate 10 that has a surface that is perpendicular to the main surfaces 12 at least in the central portion in the thickness direction by softening and/or melting the edge portions of the edge surface 14 of the glass plate 10 by irradiating the edge surface 14 of the glass plate 10 with the laser beam L such that the edge portions have a round shape, and, in order to form a surface (the side wall surface 14t) that is perpendicular to the main surfaces of the glass plate 10 on the chamfered edge surface 14 in addition to the edge surface 14 being chamfered. Accordingly, the shape of the edge surface 14 of the glass plate 10 can have a target shape without varying from the target shape, and it is possible to form the surface that is perpendicular to the main surfaces 12 and the chamfered surfaces 14c.

In order to form the chamfered surfaces 14c on the edge surface 14, according to an embodiment, the value of Pd×Th and the value of the moving speed are adjusted such that y is in a range of 11.2×x−4.7 or lower when W1>Th holds true, Pd×Th is x, and the moving speed at which the laser beam L moves along the edge surface 14 is y.

Furthermore, as shown in FIG. 4, in order for the edge surface 14 to be provided with the side wall surface 14t that is a surface perpendicular to the main surfaces 12, in addition to the chamfered surfaces 14c, according to an embodiment, the value of Pd×Th and the value of the moving speed are adjusted such that y is in a range of 11.2×x−4.7 or lower and 5.4×x−4.5 or higher when W1>Th holds true, Pd×Th is x, and the moving speed at which the laser beam L moves along the edge surface 14 is y.

Figure 5A:
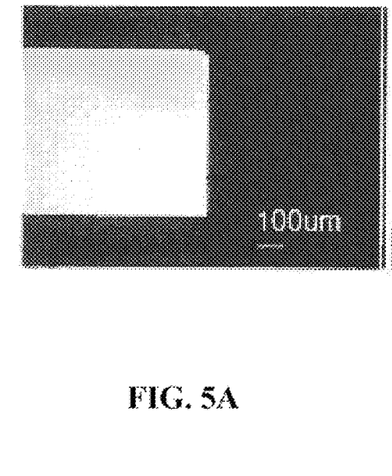
FIGS. 5A to 5C are diagrams illustrating differences between shapes of edge surfaces depending on differences in laser irradiation conditions.
Figure 5B:
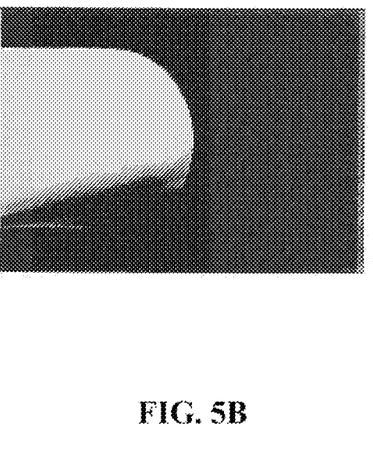
Figure 5C:
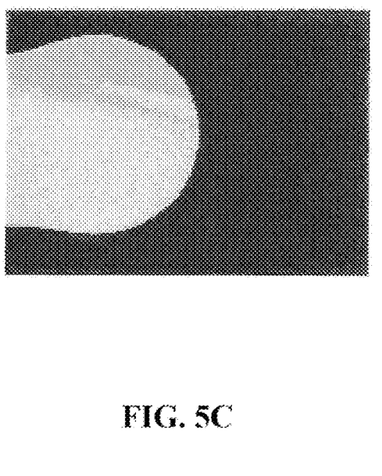

FIGS. 5A to 5C are diagrams illustrating differences between shapes of edge surfaces 14 depending on differences in irradiation conditions of the laser beam L. FIGS. 5A to 5C show examples of the shapes of the edge surfaces 14 obtained when, in the irradiation conditions, the thickness Th was fixed at 0.7 mm, the width W1 was fixed at 1.0 mm, the ratio Th/W1 was fixed at 0.7, the length W2 was fixed at 10 mm, the moving speed at an irradiation position was fixed at 2 mm/s, and Pd×Th was changed by changing the power density Pd. Note that a glass blank that has a glass transition temperature Tg of 500° C. and a diameter of 95 mm and whose edge surface is perpendicular to the main surfaces was used as a pre-processing glass blank. The edge surface 14 had a surface roughness Rz of 5 μm and an arithmetic average roughness Ra of 0.5 μm. An outer circumferential edge surface of the glass blank was irradiated with the laser beam L.

FIG. 5A shows an example in which the glass blank was not irradiated with the laser beam L, that is. Pd was equal to 0 [W/mm²]. FIG. 5B shows the shape of the edge surface 14 under the irradiation condition where Pd was equal to 1.9 [W/mm²] (Pd×Th was 1.33 [W/mm]), and FIG. 5C shows the shape of the edge surface 14 under the irradiation condition where Pd was equal to 4.0 [W/mm²] (Pd×Th was 2.8 [W/mm]).

A portion of the edge surface 14 shown in FIG. 5C has a spherical shape, and the glass plate 10 has a smaller outer diameter, and thus, the length of the glass plate 10 in the thickness direction at the edge surface 14 is longer than the thickness of the glass plate 10 (the length between the main surfaces), and thus, although the chamfered surfaces 14c are formed, the glass plate has an unfavorable shape as a glass substrate having a fixed thickness.

Therefore, it is preferable to set the irradiation conditions of the laser beam L such that the side wall surface 14t that is orthogonal to the main surfaces 12, and the chamfered surfaces 14c connecting the ends on both sides of the side wall surface 14t and the ends of the main surfaces 12 to each other are formed on the edge surface 14. It is preferable to set the range of the power density Pd to 1.2 [W/mm²] to 3.0 [W/mm²], for example, so that the outer diameter of the glass plate 10 is reduced or the length of the above-described spherical shape in the thickness direction is not larger than the thickness of the glass plate 10 (the length between the main surfaces).

According to an embodiment, the irradiation conditions Pd×Th and the moving speed are preferably set such that a ratio (C/Th) of the length C of the chamfered surface 14c extending along the main surface 12 relative to the thickness Th is in a range of 0.1 to 0.7. The function of the chamfered surface 14c provided with no corner portions can be exerted on the portion where the edge surface 14 and the main surfaces 12 are connected to each other by setting the ratio (C/Th) to 0.1 to 0.7. Also, if the ratio (C/Th) is less than 0.1, there is a risk that the chamfered surfaces 14c may not be sufficiently formed, and edges may be likely to be chipped in the subsequent film formation process or the like. Also, if the ratio (C/Th) exceeds 0.7, there is a risk that the data recording area on the main surfaces 12 may be reduced. Therefore, it is possible to adjust the ratio (C/Th) by adjusting Pd×Th in a range of 0.8 to 3.5 [W/mm], preferably in a range of 1.2 to 2.3 [W/mm], or by adjusting the value of Pd×Th and the value of the moving speed. It is more preferable to set the ratio (C/Th) to 0.25 to 0.5.

According to an embodiment, it is preferable to set irradiation conditions such that the ratio (T/Th) of the length T [mm] of the side wall surface 14t along the thickness direction relative to the thickness Th is in a range of 0.1 to 0.8. If the ratio (T/Th) is less than 0.1, there is a risk that the side wall surface 14t may not be sufficiently formed, and it may be difficult to measure the outer diameter or the inner diameter of the glass plate 10, and thus measurement variation may occur, making production control difficult. Also, if the ratio (C/Th) exceeds 0.8, there is a risk that the chamfered surfaces 14c may not be sufficiently formed, and edges may be likely to be chipped in the subsequent film formation process or the like.

According to an embodiment, the surface roughness Rz (JIS B0601: 2001) of the edge surface 14 (the chamfered surfaces 14c and the side wall surface 14t) formed by the laser beam L, is preferably 0.3 μm or less, and more preferably 0.2 μm or less, and the arithmetic average roughness Ra (JIS B0601: 2001) thereof is preferably 0.03 μm or less, and more preferably 0.02 μm or less. The surface roughness Rz and the arithmetic average roughness Ra can be measured using a laser optical microscope, for example. It is possible to smoothen the chamfered surfaces 14c and the side wall surface 14t by irradiating the edge surface 14 with the laser beam L under the above-described irradiation conditions.

Also, as shown in FIG. 1, when shape processing is performed by moving the position irradiated with the laser beam L relative to the disk-shaped glass plate 10 along the circumferential direction of the glass plate 10, it is preferable to effectively heat the edge surface 14 using the laser beam L such that the center point in the circumferential direction at the irradiation position has the maximum temperature by increasing the length W2 (see FIG. 2) in the circumferential direction of the disk shape of the glass plate 10 to some extent and gradually increasing the temperature of the edge surface 14 through heating with the laser beam L. As a result, the moving speed can be increased at the position irradiated with the laser beam L, and thus the processing time can be shortened. According to an embodiment, as shown in FIG. 2, the luminous flux of the laser beam L with which the edge surface 14 is irradiated has an elliptical shape. In this case, it is preferable that the ratio (W2/D) of the length W2 of the luminous flux of the laser beam L with which the edge surface 14 is irradiated, in the circumferential direction of the disk shape of the glass plate 10 relative to the diameter D of the glass plate 10 is in a range of 0.03 to 0.3. If the ratio (W2/D) is less than 0.03, the length W2 is relatively short, and thus the temperature of the edge surface 14 cannot be gradually and sufficiently increased, and it is difficult to shorten the processing time. If the ratio (W2/D) exceeds 0.3, the length W2 is longer relative to the circumferential length along the circumferential direction of the glass plate 10. Therefore, in this case, the irradiation position where the edge surface 14 of the glass plate 10 is irradiated with the laser beam L. (the position of the laser beam L in the irradiation direction) greatly changes depending on the curvature of the glass plate 10, and as a result, the luminous flux spreads and it is difficult to efficiently perform heating in the circumferential direction.

Also, in order to chamfer the edge portions of the edge surface 14 of the glass plate 10 into a round shape by softening and/or melting the edge portions of the edge surface 14 by irradiating the edge surface 14 of the glass plate 10 with a laser beam, and in order to form a surface that is perpendicular to the main surfaces of the glass plate 10 on the chamfered edge surface 14 in addition to the edge surface 14 being chamfered, even if the edge surface 14 is irradiated with a laser beam with the value of Pd×Th and the value of the moving speed being controlled, the ratio (W2/D) is preferably in a range of 0.03 to 0.3 due to the above-described reasons.

Note that, due to the edge surface 14 being irradiated with the laser beam L, if the power density Pd is gradually increased, the diameter D of the glass plate 10 increases by several tens of micrometers to several hundreds of micrometers because the shape of the edge surface 14 is rounded, and if the power density Pd is further increased, the rounding range is increased, and the length in the thickness direction increases to form a spherical shape, and accordingly, the diameter D of the glass plate 10 decreases. That is, the diameter D of the glass plate 10 after being subjected to shape processing changes depending on the magnitude of the power density Pd. The example shown in FIG. 5C is an example in which the edge surface 14 has a spherical shape due to an excessive increase in the power density Pd and the edge surface 14 being overheated, and thus the diameter of the glass plate 10 is shortened. The glass plate 10 such as that shown in FIG. 5C is not preferable because the outer diameter thereof is smaller than the target diameter of the glass plate 10. Furthermore, it is not preferable to overheat the edge surface 14 because the spherical shape is also likely to vary, and the diameter of the glass plate 10 cannot be made uniform. Thus, it is preferable that the power density Pd is set such that the diameter of the glass plate 10 formed through irradiation with the laser beam L is larger than the diameter of the glass plate 10 before being irradiated with the laser beam L.

It is preferable that the moving speed at which the laser beam L moves along the edge surface 14 is in a range of 0.7 to 100 [mm/s]. Here, the moving speed refers to a moving speed relative to the edge surface 14. From the viewpoint of processing efficiency, it is preferable that shape processing using the laser beam L is complete when the laser beam L makes one rotation around the glass plate 10. Here, if the moving speed exceeds 100 [mm/s], it may be difficult to estimate the timing at which the processing will be complete, and difficult to match the start point and the end point of the processing. Also, if the moving speed is lower than 0.7 [mm/s], it is difficult to control the shape of the edge surface because the shape of the edge surface will vary due to a slight change in Pd×Th. Even if a shape in which the side wall surface 14t and the chamfered surfaces 14c shown in FIG. 4 are provided is obtained, the edge surface 14 is likely to be overheated only by slightly increasing Pd×Th, and to have a shape such as that shown in FIG. 5C, and thus stable production is unlikely to be achieved, for example. In this regard, it is preferable that the moving speed is in a range of 0.7 to 100 [mm/s].

Note that it is more preferable that the moving speed is in a range of 20 to 100 [mm/s]. If the moving speed is 20 [mm/s] or more, a change in the shape of the edge surface 14 with respect to a change in Pd×Th is comparatively smooth, and productivity is improved due to the processing time being shortened. Therefore, it is more preferable that the moving speed is in a range of 20 to 100 [mm/s].

Note that it is preferable to set the temperature of the glass plate 10 higher than room temperature during shape processing for performing chamfering using the laser beam L in order to promote the formation of chamfered surfaces using the laser beam L. At this time, it is preferable that the temperature thereof is Tg−50° C. (Tg indicates the glass transition temperature of the glass plate 10) or lower. Furthermore, it is more preferable to set the temperature of the glass plate 10 when performing shape processing for chamfering to a range of 150 to 400° C. If the temperature of the glass plate 10 is less than 150° C., there are cases where the chamfered surfaces 14c cannot be sufficiently formed. If the temperature of the glass plate 10 is higher than 400° C., there are cases where the glass plate 10 deforms and it is difficult to irradiate the edge surface 14 with the laser beam L. The glass plate 10 can be heated before this chamfering processing is carried out, or the glass plate 10 can be heated while this chamfering processing is being performed, as a method for heating the glass plate 10, for example. Note that, if the glass plate 100 is heated while performing chamfering processing, it is difficult to control temperature due to a synergistic effect with the heating by the laser beam L, and thus there are cases where the shape of the edge surface 14 may vary greatly. Therefore, if the glass plate 10 is to be heated, it is preferable to heat the glass plate 10 prior to the chamfering processing. In this case, it is preferable to keep the glass plate 10 warm during the chamfering processing.

An edge surface of the inner circumferential edge portion of the glass plate 10 whose edge surface 14 has been subjected to shape processing in this manner is also subjected to shape processing using the laser beam L, and then various processes are performed on the glass plate 10 such that the glass plate 10 has properties suitable for the final product.

Edge surface polishing processing is performed on the edge surface 14 subjected to the shape processing, for example. In the edge surface polishing processing, it is possible to set the surface roughness Rz of the chamfered surface 14c and the surface roughness Rz of the side wall surface 14t to 0.3 µm or less, and thus to make the amount of machining allowance in edge surface polishing processing smaller than in processing on the chamfered surfaces 14c using a formed grindstone in a conventional manner, and it is possible to improve production costs and production efficiency. According to an embodiment, edge surface polishing processing need not be performed at all.

If a magnetic-disk glass substrate is to be produced from the glass plate 10, the main surfaces 12 of the glass plate 10 are ground and polished using the glass plate 10 as an intermediate glass plate after the above-described edge surface polishing processing and before the glass plate 10 becomes a magnetic-disk glass substrate.

In grinding and polishing processing, the glass plate 10 is ground and then polished.

In grinding processing, a double-side grinding apparatus provided with a planetary gear mechanism is used to grind the main surfaces 12 of the glass plate 10. Specifically, the main surfaces on both sides of the glass plate 10 are ground while the glass plate 10 is held in a holding hole provided in a holding member of the double-side grinding apparatus. The double-side grinding apparatus has a pair of upper and lower surface plates (an upper surface plate and a lower surface plate), and the glass plate 10 is held between the upper surface plate and the lower surface plate. Then, it is possible to grind the two main surfaces of the glass plate 10 by moving the glass plate 10 and the surface plates relative to each other while moving one or both of the upper surface plate and the lower surface plate and supplying a coolant. Grinding members obtained by forming fixed abrasive particles in which diamonds are fixed by resin into a sheet shape are mounted on the surface plates, and then grinding processing can be performed, for example.

Then, first polishing is performed on the main surfaces of the ground glass plate 10. Specifically, the main surfaces of the glass plate 10 on both sides are polished while the glass plate 10 is held in a holding hole provided in a polishing carrier of the double-side polishing apparatus. The first polishing is performed in order to remove blemishes and strain remaining on the ground main surfaces or adjust minute unevenness (micro-waviness and roughness) remaining on the surfaces.

In the first polishing processing, the glass plate 10 is polished using a double-side polishing apparatus having a configuration similar to that of the above-described double-side grinding apparatus that is used in the grinding processing with fixed abrasive particles, while a polishing slurry is provided. In the first polishing processing, a polishing slurry containing loose abrasive particles is used. Cerium oxide abrasive particles, zirconia abrasive particles, or the like are used as loose abrasive particles used in the first polishing, for example. Similar to the double-side grinding apparatus, the glass plate 10 is also held between the upper surface plate and the lower surface plate in the double-side polishing apparatus. Tabular polishing pads (resin polishers, for example) having an overall annular shape are attached to the upper surface of the lower surface plate and the bottom surface of the upper surface plate. The glass plate 10 and the surface plates are moved relative to each other by moving one or both of the upper surface plate and the lower surface plate, and thereby the two main surfaces of the glass plate 10 are polished. The size of polishing abrasive particles is preferably in a range of 0.5 to 3 μm in terms of an average particle diameter (d50).

The glass plate 10 may be chemically strengthened after the first polishing. In this case, a melt in which potassium nitrate and sodium nitrate are mixed, for example, can be used as the chemical strengthening liquid, and the glass plate 10 is immersed in the chemical strengthening liquid. Accordingly, it is possible to form a compressive stress layer on the surface of the glass plate 10 through ion exchange.

Then, the second polishing is performed on the glass plate 10. The second polishing processing is performed in order to mirror-polish the main surfaces. A double-side polishing apparatus having a configuration that is similar to that of the double-side polishing apparatus used in the first polishing is used in the second polishing as well. Specifically, the main surfaces on both sides of the glass plate 10 are polished while the glass plate 10 is held in a holding hole provided in a polishing carrier of the double-side polishing apparatus. The second polishing processing differs from the first polishing processing in that the type and particle size of loose abrasive particles are different, and the hardness of the resin polishers is also different. It is preferable that the hardness of a resin polisher is smaller than that in the first polishing processing. A polishing liquid containing colloidal silica as loose abrasive particles is supplied between the polishing pads of the double-side polishing apparatus and the main surfaces of the glass plate 10, and the main surfaces of the glass plate 10 are polished, for example. The size of the polishing abrasive particles used in the second polishing is preferably in a range of 5 to 50 nm in terms of an average particle diameter (d50).

Note that, whether or not chemical strengthening processing is to be carried out need only be selected as appropriate in consideration of the composition of the glass and how necessary chemical strengthening processing may be therefor. Other polishing processing may be also be performed in addition to the first polishing processing and the second polishing processing, or processing for polishing two main surfaces may be completed through single polishing processing. Also, the order of the above-described processes may be changed as appropriate.

It is possible to obtain a magnetic-disk glass substrate that satisfies the conditions required for a glass plate 10 for a magnetic disk by polishing main surfaces of the glass plate 10 in this manner.

Thereafter, a magnetic disk can be produced by forming at least a magnetic layer on the glass plate 10 produced by polishing the main surfaces.

The main surfaces 12 of the glass plate 10 subjected to shape processing are ground or polished in the method for manufacturing the glass plate 10. In this case, no edge surfaces 14 are polished after the edge surfaces 14 are processed and before the main surfaces 12 are ground or polished, or even if an edge surface 14 is polished, the amount of machining allowance for polishing an edge surface 14 can be set to 5 μm or less. Thus, it is possible to set a change in the outer diameter of the glass plate 10 to 10 μm or less. This is because it is possible to form the chamfered surfaces 4c and the side wall surface 14t with low surface unevenness using the laser beam L.

In recent years, there has been increasing demand for increasing the storage capacity of hard disk drive devices for big data analysis and the like. Therefore, attempts have been made to increase the number of magnetic disks to be mounted on one hard disk drive device. If attempts are to be made to increase the storage capacity by increasing the number of magnetic disks to be incorporated into a hard disk drive device, the thickness of a magnetic-disk glass substrate occupying the majority of the thickness of a magnetic disk in the limited space in the magnetic disk drive device needs to be reduced.

Here, if the thickness of the magnetic-disk glass substrate is reduced, the rigidity of the glass substrate decreases, large vibration is likely to occur, and the vibration is unlikely to stop. When the amplitude of vibration of a glass substrate is high, a magnetic disk often comes into contact with an adjacent magnetic disk, and a magnetic disk located at the top of multiple magnetic disks arranged at regular intervals may also come into contact with a ceiling surface of a magnetic disk storage container of a hard disk drive device. There are also cases where a portion of a magnetic disk is chipped and particles are formed when such contact occurs.

Thus, it is not preferable that the rigidity of a magnetic-disk glass substrate is low. In this regard, according to an embodiment, the Young's modulus of the glass plate 10 is preferably 70 [GPa] or more, more preferably 80 [GPa] or more, and even more preferably 90 [GPa] or more.

The thickness Th of the glass plate 10 is preferably 0.7 mm or less, and more preferably 0.6 mm or less. Accordingly, it is possible to increase the number of magnetic disks to be mounted on a hard disk drive device by one or two.

Although the composition of such a glass plate 10 is not limited, the following composition is preferable.
(Glass 1)
  $SiO_2$ 56 mol % to 80 mol %,
  $Li_2O$ 1 mol % to 10 mol %.
  $B_2O_3$ 0 mol % to 4 mol %, and
  a total content of MgO and CaO (MgO+CaO) 9 mol % to 40 mol %.

The glass 1 has a specific gravity of 2.75 g/cm³ or less, and a glass transition temperature Tg of 650° C. or higher.
(Glass 2)
  $SiO_2$ 56 mol % to 80 mol %,
  $Li_2O$ 1 mol % to 10 mol %.
  $B_2O_3$ 0 mol % to 4 mol %,
  a total content of MgO and CaO (MgO+CaO) 4 mol % to 40 mol %, and a mole ratio of a total content of $SiO_2$ and $ZrO_2$ relative to an $Al_2O_3$ content (($SiO_2$+$ZrO_2$)/$Al_2O_3$) ranges from 2 to 13.

The glass 2 has a specific gravity of 2.50 g/cm³ or less, a glass transition temperature Tg of 500° C. or higher, and a specific elastic modulus of 30 GPa·cm³/g or more at 20° C.
(Glass 3)
  Amorphous oxide glass contains $SiO_2$ in an amount of 56 mol % to 65 mol %,
  $Al_2O_3$ in an amount of 5 mol % to 20 mol %.
  $B_2O_3$ in an amount of 0 mol % to 4 mol %,
  MgO in an amount of 3 mol % to 28 mol %, and
  $Li_2O$ in an amount of 1 mol % to 10 mol %,
  in which a total content of $SiO_2$ and $Al_2O_3$ ($SiO_2$+$Al_2O_3$) ranges from 65 mol % to 80 mol %,
  a total content of MgO and CaO (Mg+CaO) ranges from 11 mol % to 30 mol %,
  a total content of MgO, CaO, SrO, and BaO (MgO+CaO+SrO+BaO) ranges from 12 mol % to 30 mol %,
  a sum of the MgO content, 0.7×the CaO content, the $Li_2O$ content, the $TiO_2$ content, and the $ZrO_2$ content (MgO+0.7CaO+L$_2$O+TiO$_2$+ZrO$_2$) is more than or equal to 16 mol %,
  a sum of 5×the $Li_2O$ content, 3×the $Na_2O$ content, 3×the $K_2O$ content, 2×the $B_2O_3$ content, the MgO content, 2×the CaO content, 3×the SrO content, and the BaO content (5Li$_2$O+3Na$_2$O+3K$_2$O+2B$_2$O$_3$+MgO+2CaO+3SrO+BaO ranges from 32 mol % to 58 mol %.
  a sum of the $SiO_2$ content, the $Al_2O_3$ content, the $B_2O_3$ content, the $P_2O_5$ content, 1.5×the $Na_2O$ content, 1.5× the $K_2O$ content, 2×the SrO content, 3×the BaO content, and the ZnO content ($SiO_2$+$Al_2O_3$+$B_2O_3$+$P_2O_a$+1.5Na$_2$O+1.5K$_2$O+2SrO+3BaO+ZnO) is less than or equal to 86 mol %,
  a sum of the $SiO_2$ content, the $Al_2O_3$ content, the $B_2O_3$ content, the $P_2O_5$ content,
  the $Na_2O$ content, the $K_2O$ content, the CaO content, 2×the SrO content, and 3×the BaO content ($SiO_2$+$Al_2O_3$+$B_2O_5$+$P_2O$; +Na$_2$O+K$_2$O+CaO+2SrO+3BaO) is less than or equal to 92 mol %,
  a mole ratio of the CaO content relative to the MgO content (CaO/MgO) is less than or equal to 2.5,
  a mole ratio of the $Na_2O$ content relative to the $Li_2O$ content (Na$_2$O/Li$_2$O) is less than or equal to 5,
  a mole ratio of the $Li_2O$ content relative to the total content of MgO and CaO (Li$_2$O/(MgO+CaO)) ranges from 0.03 to 0.4,
  a mole ratio of the $SiO_2$ content relative to the total content of $Li_2O$, $Na_2O$, and $K_2O$ (SiO$_2$/(Li$_2$O+Na$_2$O+K$_2$O)) ranges from 4 to 22,
  a mole ratio of the total content of $SiO_2$ and $ZrO_2$ relative to the $Al_2O_3$ ((SiO$_2$+ZrO$_2$)/Al$_2$O$_3$) ranges from 2 to 10,
  a mole ratio of the total content of $TiO_2$ and $Al_2O_3$ relative to the total content of MgO and CaO ((TiO$_2$+Al$_2$O$_3$)/(MgO+CaO))) ranges from 0.35 to 2,
  a mole ratio of the total content of MgO and CaO relative to the total content of MgO, CaO, SrO, and BaO ((MgO+CaO)/(MgO+CaO+SrO+BaO)) ranges from 0.7 to 1, a mole ratio of the BaO content relative to the total content of MgO, CaO, SrO, and BaO (BaO/(MgO+CaO+SrO+BaO)) is less than or equal to 0.1,
  and a mole ratio of the $P_2O_5$ content relative to the total content of $B_2O_3$, $SiO_2$, $Al_2O_3$, and $P_2O_5$ (P$_2$O$_5$/(B$_2$O$_3$+SiO$_2$+Al$_2$O$_3$+P$_2$O$_5$)) is less than or equal to 0.005,
  the oxide glass has a glass transition temperature of 670° C. or higher and a Young's modulus of 90 GPa or more,
  a specific gravity of 2.75 or less, and
  an average coefficient of linear thermal expansion at 100° C. to 300° C. ranges from $40 \times 10^{-7}$ to $70 \times 10^{-7}$/° C.

According to an embodiment, the glass plate 10 is preferably composed of glass having a glass transition temperature Tg of 500° C. or higher, and the glass transition temperature Tg is more preferably 650° C. or higher. The higher the glass transition temperature Tg is, the more thermal shrinkage that occurs when the glass plate 10 is heated and deformation caused by thermal shrinkage can be suppressed. Thus, the glass transition temperature Tg is preferably set to 500° C. or higher, and more preferably set to 650° C. or higher in consideration of heat treatment performed to form a magnetic film for a magnetic disk or the like on a substrate 1.

According to an embodiment, the glass plate 10 is preferably composed of a material having a coefficient of linear thermal expansion of $100 \times 10^{-7}$ [1/K] or less, more preferably composed of a material having a coefficient of linear thermal expansion of $95 \times 10^{-7}$ [1/K] or less, even more preferably composed of a material having a coefficient of linear thermal expansion of $70 \times 10^{-7}$ [1/K] or less, and particularly preferably composed of a material having a coefficient of linear thermal expansion of $60 \times 10^{-7}$ [1/K] or less. The lower limit of the coefficient of linear thermal expansion of the glass plate 10 is $40 \times 10^{-7}$ [1/K], for example. A "coefficient of linear thermal expansion" here refers to a coefficient of linear thermal expansion obtained by a difference between thermal expansion at 100° C. and thermal expansion at 300° C. As a result of using such a coefficient of linear thermal expansion, it is possible to suppress thermal expansion in heat treatment when forming a magnetic film or the like, and to suppress thermal strain in the glass plate 10 around a holding portion when a holding member of a film forming device fixes the glass plate 10 and holds an edge surface of the outer circumferential edge portion thereof. A conventional substrate made of an aluminum alloy has a coefficient of linear thermal expansion of $242 \times 10^{-7}$ [1/K], whereas the glass plate 10 according to an embodiment has a coefficient of linear thermal expansion of $51 \times 10^{-7}$ [1/K], for example.

Experimental Examples

In order to confirm the effects of the method for manufacturing the glass plate 10, the edge surface 14 was processed under various irradiation conditions of the laser beam L, specifically, under various conditions in which Pd×Th [W/mm] was changed, and the shape of the edge surface 14 was examined. At that time, the moving speed [mm/s] at which the laser beam L moves along the edge surface 14 was also adjusted.

After the glass plate 10 was heated such that the entire glass plate 10 had a temperature of 350° C. before being irradiated with the laser beam L, the edge surface of the outer circumferential edge portion of the glass plate 10 was irradiated with the laser beam L in a state in which the temperature of the glass plate 10 was maintained. The edge surface 14 was irradiated with the laser beam L from a normal direction of the edge surface 14.

Meanwhile, the shapes of the edge surfaces 14 formed through irradiation with the laser beam L were visually evaluated according to four criteria of Evaluations A to D using an enlarged photograph obtained by using a microscope.

Evaluation A: The edge surface 14 includes a surface (the side wall surface 140) that is perpendicular to the main surfaces 12 and the chamfered surfaces 14c, and the length T (see FIG. 4) in the thickness direction of the perpendicular surface is 1/10 or more of the thickness Th.

Evaluation B: The edge surface 14 does not include a surface that is perpendicular to the main surfaces 12, and only includes the chamfered surfaces 14c, and the length of a portion provided with the chamfered surfaces in the thickness direction is smaller than or equal to the thickness Th of the original glass plate (the length T is less than 1/10 of the thickness Th).

Evaluation C: As shown in FIG. 5C, the edge surface 14 has a spherical shape, and the length of the portion provided with the chamfered surfaces in the thickness direction is larger than the thickness of the original glass plate.

Evaluation D: As shown in FIG. 5A, the edge surface 14 does not include the chamfered surface 14c. The glass plate is a rejected product.

In Table 1 below, glass plates with a diameter of 95 mm and a thickness of 0.7 mm were used as the glass plates 10. The composition of the above-described glass 1 was used as the glass composition of the glass plates. The luminous flux of the laser beam L on the edge surface 14 was made to have an elliptical shape in which the width W1 in the thickness direction was 1 mm and the length W2 in the circumferential direction was 10 mm such that the luminous flux evenly protruded on both sides of the edge surface 14 of the glass plate 10. The power density Pd and the moving speed V of the laser beam L were changed in various ways.

TABLE 1

| Conditions | Pd × Th [W/mm] | V [mm/s] | Results of Evaluation |
|---|---|---|---|
| 1 | 0.0 | 2 | D |
| 2 | 0.4 | 2 | D |
| 3 | 0.9 | 2 | A |
| 4 | 1.1 | 2 | A |
| 5 | 1.3 | 2 | B |
| 6 | 2.8 | 2 | C |
| 7 | 0.9 | 20 | D |
| 8 | 1.8 | 20 | D |
| 9 | 2.7 | 20 | A |
| 10 | 3.6 | 20 | A |
| 11 | 4.5 | 20 | A |
| 12 | 5.3 | 20 | B |
| 13 | 6.2 | 20 | B |
| 14 | 7.1 | 20 | C |
| 15 | 3.6 | 40 | D |
| 16 | 4.5 | 40 | A |
| 17 | 5.3 | 40 | A |
| 18 | 6.7 | 40 | A |
| 19 | 8.0 | 40 | A |
| 20 | 8.9 | 40 | B |
| 21 | 10.7 | 40 | B |
| 22 | 12.5 | 40 | C |
| 23 | 14.3 | 40 | C |
| 24 | 5.3 | 70 | D |
| 25 | 7.1 | 70 | A |
| 26 | 8.9 | 70 | A |
| 27 | 11.1 | 70 | A |
| 28 | 13.4 | 70 | A |
| 29 | 15.2 | 70 | B |
| 30 | 17.8 | 70 | B |
| 31 | 20.5 | 70 | C |
| 32 | 8.0 | 100 | D |
| 33 | 9.8 | 100 | A |
| 34 | 12.5 | 100 | A |
| 35 | 15.6 | 100 | A |
| 36 | 18.7 | 100 | A |
| 37 | 21.4 | 100 | B |
| 38 | 24.1 | 100 | B |
| 39 | 26.7 | 100 | B |
| 40 | 29.4 | 100 | C |

A glass plate having a diameter of 95 mm and a thickness of 0.7 mm, a glass plate having a diameter of 97 mm and a thickness of 0.7 mm, a glass plate having a diameter of 65 mm and a thickness of 0.7 mm, a glass plate, having a diameter of 95 mm and a thickness of 0.6 mm, and a glass plate having a diameter of 95 mm and a thickness of 0.55 mm were used as the glass plates used in Table 2 below. The composition of the above-described glass 1 was used as the glass composition of the glass plates. The luminous flux of the laser beam L on the edge surface 14 was made to have an elliptical shape in which the width W1 in the thickness direction was 1 mm and the length W2 in the circumferential direction was changed, and the power density Pd of the laser beam L, was changed to various power densities. The moving speed [mm/s] at which the laser beam IL moved along the edge surface 14 was fixed at 70 [m/s].

Similarly to Table 1, the shapes of the edge surfaces 14 were evaluated according to four criteria of Evaluations A to D.

TABLE 2

| Conditions | Diameter [mm] | Thickness Th [mm] | Width W1 [mm] | Length W2 [mm] | Pd × Th [W/mm] | Results of Evaluation |
|---|---|---|---|---|---|---|
| 41 | 95 | 0.7 | 1 | 5 | 10.7 | A |
| 42 | 95 | 0.7 | 1 | 15 | 11.0 | A |
| 43 | 95 | 0.7 | 1 | 20 | 11.1 | A |
| 44 | 95 | 0.7 | 1 | 5 | 15.2 | B |
| 45 | 95 | 0.7 | 1 | 15 | 15.2 | B |
| 46 | 95 | 0.7 | 1 | 20 | 15.2 | B |
| 47 | 95 | 0.7 | 1 | 5 | 20.5 | C |

TABLE 2-continued

| Conditions | Diameter [mm] | Thickness Th [mm] | Width W1 [mm] | Length W2 [mm] | Pd × Th [W/mm] | Results of Evaluation |
|---|---|---|---|---|---|---|
| 48 | 95 | 0.7 | 1 | 15 | 20.2 | C |
| 49 | 97 | 0.7 | 1 | 10 | 11.1 | A |
| 50 | 65 | 0.7 | 1 | 10 | 11.1 | A |
| 51 | 95 | 0.6 | 1 | 10 | 11.1 | A |
| 52 | 95 | 0.55 | 1 | 10 | 11.2 | A |

Figure 6:
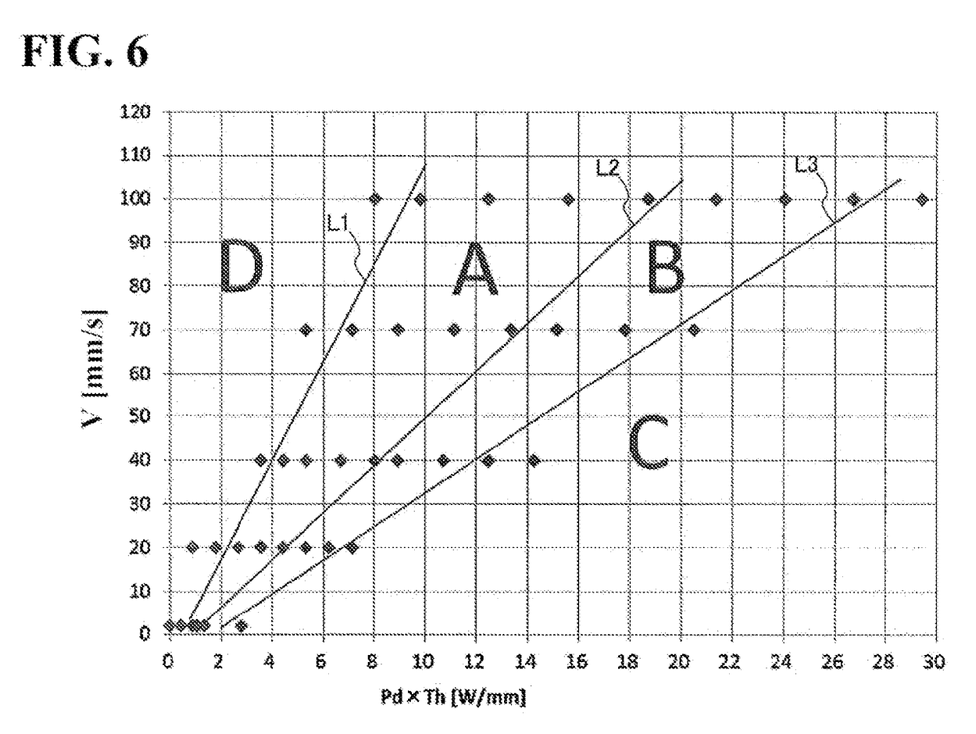
FIG. 6 is a diagram showing the results of evaluation of experimental examples.

FIG. 6 is a diagram showing the results of evaluation shown in Table 1. FIG. 6 shows the plots under conditions 1 to 40.

According to FIG. 6, if the moving speed V is 0.7 [mm/s] or higher, the chamfered surfaces 14c can be formed under the conditions where at least Pd×Th is 0.8 [W/mm] or more in order to obtain Evaluations A to C in which the chamfered surfaces 14c are formed. If the moving speed V is lower than 0.7 [mm/s], the range of Pd×Th in which Evaluations A and B are obtained is extremely narrow. Therefore, even if a shape in which the perpendicular surface and the chamfered surfaces 14c are provided is obtained, the edge surface 14 is likely to be overheated only by slightly increasing Pd×Th, and to have a shape such as that shown in FIG. 5C, and thus stable production is unlikely to be achieved. In this regard, it is preferable that the moving speed V is 0.7 [mm/s] or higher.

On the other hand, as shown in FIG. 6, if the moving speed V is changed, it is preferable to adjust the value of Pd×Th. In this case, when Pd×Th [mm/s] is x and the moving speed V [mm/s] is y, the chamfered surfaces 14c can be formed by setting y to 11.2×x−4.7 or lower. A straight line L1 shown in FIG. 6 indicates the straight line of y=11.2× x−4.7. In this case, in order to obtain Evaluation A, that is, in order for the edge surface to include a surface that is perpendicular to the main surfaces and whose length is 1/10 or more of the thickness Th and the chamfered surfaces 14c, it is preferable that y is set to 11.2×x−4.7 or lower and 5.4×x−4.5 or higher. A straight line L2 shown in FIG. 6 indicates the straight line of y=5.4×x−4.5. Thus, when Pd×Th is x and the moving speed V is y, the edge surface 14 includes the chamfered surfaces 14c and the surface that is perpendicular to the main surfaces 12 (the surface whose length is 1/10 or more of the thickness Th) due to the value of Pd×Th and the value of the moving speed V being adjusted such that y is in a range of 11.2×x−4.7 or lower and 5.4×x−4.5 or higher. Accordingly, as described above, it is possible to suppress variations in the outer diameter (diameter) or the inner diameter (the diameter of the circular hole 16) of the glass plate 10 in one glass plate 10 or between the glass plates 10.

Also, in order to avoid Evaluation C and obtain Evaluation B, that is, in order to obtain the glass plate 10 (see FIG. 5C) in which the edge surface 14 does not include a surface perpendicular to the main surfaces 12 and includes only the chamfered surfaces 14c, and the length of the chamfered portion in the thickness direction is equal to or shorter than the thickness of the original glass plate, it is preferable to adjust the value of Pd×Th and the value of the moving speed V such that, when the Pd×Th is x and the moving speed V is y, y is in a range of less than 5.4×x−4.5 and 3.8×x−5.6 or higher. A straight line L3 shown in FIG. 6 indicates the straight line of y=3.8×x−5.6.

Also, based on the results shown in Table 2, it was found that, even if the diameter, the thickness Th, the width W1, and the length W2 of the glass plate 10 are changed, the results of evaluation do not change as long as the value of Pd×Th and the value of the moving speed V are set to ranges with Evaluations A to C shown in FIG. 6.

Note that all the ratios (C/Th) ranged from 0.1 to 0.7 under the conditions in which Evaluations A and B were obtained in Tables 1 and 2. Also, all of the glass plates 10 had a surface roughness Rz of 0.3 μm or less and an arithmetic average roughness Ra of 0.03 μm or less under the conditions in which Evaluations A to C were obtained.

As described above, the effects of the method for manufacturing a glass plate according to this embodiment are clear.

As described above, although a method for manufacturing a glass plate, a method for chamfering a glass plate, and a method for manufacturing a magnetic disk according to the present invention have been described in detail, the present invention is not limited to the above-described embodiments and examples etc., and it will be appreciated that various improvements and modifications can be made without departing from the gist of the present invention.

The invention claimed is:

1. A method for manufacturing a glass plate in which shape processing is performed on an edge surface of a glass plate having a disk shape,
    the glass plate before the shape processing having
        a main surface and
        an edge surface having at least a surface that is perpendicular to the main surface
        in a central portion of the glass plate in a thickness direction of the glass plate,
    the method comprising
    processing the edge surface into a target shape in which a chamfered surface is formed on the edge surface, by irradiating the edge surface with a laser beam to form the chamfered surface on the edge surface while moving the laser beam relative to the edge surface in a circumferential direction of the glass plate, and
    the processing of the edge surface being performed by adjusting a value of Pd×Th and a value of a moving speed at which the laser beam moves relative to the edge surface along the edge surface,
    such that W1>Th holds true,
        where a width of luminous flux of the laser beam in the thickness direction of the glass plate at an irradiation position of the edge surface is W1 (mm), and a thickness of the glass plate is Th (mm) that is 0.7 mm or less,
    such that y is in a range of 11.2×x−4.7 or lower and 3.8×x−5.6 or more,
        where a power density of the laser beam is Pd (W/mm$^2$), Pd×Th is x, and the moving speed is y (mm/s), and
    such that the moving speed is 20 (mm/s) or more, and the Pd×Th is 14.3 (W/mm) or more.

2. The method for manufacturing a glass plate according to claim 1,
    wherein the edge surface of the glass plate is irradiated with the laser beam from a normal direction of the edge surface.

3. The method for manufacturing a glass plate according to claim 1,
    wherein, the processing of the edge surface is performed by setting irradiation conditions of the laser beam so as to form, on the edge surface, a side wall surface that is orthogonal to two opposing main surfaces of the glass plate, and chamfered surfaces connecting ends on both sides of the side wall surface and ends of the main surfaces to each other.

4. The method for manufacturing a glass plate according to claim 3,
wherein the irradiation conditions are set such that a ratio (C/Th) of a length C (mm), which is a length of the chamfered surface extending along the main surface, relative to the thickness Th is in a range of 0.1 to 0.7.

5. The method for manufacturing a glass plate according to claim 1,
wherein a surface roughness Rz of the edge surface formed by the laser beam is 0.3 μm or less, and an arithmetic average roughness Ra thereof is 0.03 μm or less.

6. The method for manufacturing a glass plate according to claim 1,
wherein the luminous flux of the laser beam with which the edge surface is irradiated has an elliptical shape, and a ratio (W2/D) of a length W2 (mm) of the luminous flux of the laser beam, in the circumferential direction, with which the edge surface is irradiated, relative to a diameter D (mm) of the glass plate is in a range of 0.03 to 0.3.

7. The method for manufacturing a glass plate according to claim 1,
wherein the power density Pd is set such that a diameter of the glass plate formed through irradiation with the laser beam is larger than a diameter of the glass plate before being irradiated with the laser beam.

8. The method for manufacturing a glass plate according to claim 1,
wherein the moving speed is 20 (mm/s) or more and 100 (mm/s) or less.

9. The method for manufacturing a glass plate according to claim 1,
wherein the glass plate has a Young's modulus of 70 (GPa) or more.

10. The method for manufacturing a glass plate according to claim 1,
wherein the glass plate has a coefficient of linear thermal expansion of $100 \times 10^{-7}$ (1/K) or less.

11. The method for manufacturing a glass plate according to claim 1, further comprising
grinding or polishing the main surface of the glass plate subjected to the processing of the edge surface.

12. A method for manufacturing a glass substrate for a magnetic disk, the method comprising:
the method for manufacturing a glass plate according to claim 11,
wherein the glass plate having the disk shape is the glass substrate for a magnetic disk including a circular hole at a central position, and
the edge surface is an inner circumferential edge surface or an outer circumferential edge surface of the glass substrate for a magnetic disk.

13. A method for chamfering a glass plate in which a chamfered surface is formed on an edge surface of a glass plate having a disk shape through irradiation with a laser beam,
wherein the edge surface of the glass plate before the chamfered surface is formed has at least a surface that is perpendicular to a main surface in a central portion of the glass plate in a thickness direction of the glass plate, and the method comprises:
chamfering an edge portion of the edge surface of the glass plate into a round shape by
obtaining in advance a relationship between PdxTh, a moving speed V, and a shape of the edge surface to be obtained by the chamfering, by examining shapes of edge surfaces of glass plates that are obtained by irradiating the edge surfaces with the laser beam under a plurality of conditions, respectively, the plurality of conditions being conditions in which the moving speed V, a power density Pd of the laser beam, and a thickness for the glass plates are each changed, wherein a thickness of the glass plate is Th (mm), the power density of the laser beam is Pd (W/mm$^2$), and the moving speed at which the laser beam moves relative to the edge surface along the edge surface is V,
controlling the PdxTh and the moving speed V based on the obtained relationship such that the chamfered surface is formed so as to have a round shape, and
softening and/or melting the edge portion by irradiating the edge surface of the glass plate with the laser beam in accordance with the PdxTh and the moving speed V that have been controlled.

14. A method for manufacturing a glass plate, the method comprising:
the method for chamfering a glass plate according to claim 13, wherein
the glass plate has a coefficient of linear thermal expansion of $100 \times 10^{-7}$ (1/K) or less.

15. The method for manufacturing a glass plate according to claim 14, further comprising
grinding or polishing the main surface of the glass plate subjected to the chamfering.

16. A method for manufacturing a glass substrate for a magnetic disk, the method comprising:
the method for manufacturing a glass plate according to claim 15,
wherein the glass plate having the disk shape is the glass substrate for a magnetic disk including a circular hole at a central position, and
the edge surface is an inner circumferential edge surface or an outer circumferential edge surface of the glass substrate for a magnetic disk.

17. A method for chamfering a glass plate in which a chamfered surface is formed on an edge surface of a glass plate having a disk shape through irradiation with a laser beam,
wherein the edge surface of the glass plate before the chamfered surface is formed has at least a surface that is perpendicular to a main surface in a central portion of the glass plate in a thickness direction of the glass plate, and
the method comprises:
controlling PdxTh and a moving speed V
such that an edge portion of the edge surface of the glass plate is chamfered into a round shape by softening and/or melting the edge portion of the edge surface of the glass plate by irradiating the edge surface of the glass plate with the laser beam, wherein a thickness of the glass plate is Th (mm) that is 0.7 mm or less, a power density of the laser beam is Pd (W/mm$^2$), and the moving speed at which the laser beam moves relative to the edge surface along the edge surface is V, and such that the moving speed is 20 (mm/s) or more, and the Pd×Th is 14.3 (W/mm) or more; and chamfering the edge portion of the edge surface of the glass plate in accordance with the Pd×Th and the moving speed V that have been controlled, and the controlling of the Pd×Th and the moving speed V being performed by adjusting a value of the Pd×Th and a value of the moving speed such that y is in a range of 11.2×x−4.7 or lower and 3.8×x−5.6 or higher, wherein the Pd×Th is x, and the moving speed V is y (mm/s).

18. A method for manufacturing a glass plate, the method comprising:

the method for chamfering a glass plate according to claim 17, wherein the glass plate has a coefficient of linear thermal expansion of $100 \times 10^{-7}$ (1/K) or less.

19. The method for manufacturing a glass plate according to claim 18, further comprising grinding or polishing the main surface of the glass plate subjected to the chamfering.

20. A method for manufacturing a glass substrate for a magnetic disk, the method comprising:

the method for manufacturing a glass plate according to claim 19, wherein the glass plate having the disk shape is the glass substrate for a magnetic disk including a circular hole at a central position, and the edge surface is an inner circumferential edge surface or an outer circumferential edge surface of the glass substrate for a magnetic disk.

* * * * *